(12) United States Patent
Eiche et al.

(10) Patent No.: US 6,715,130 B1
(45) Date of Patent: Mar. 30, 2004

(54) SOFTWARE REQUIREMENTS METRICS AND EVALUATION PROCESS

(75) Inventors: Brooke Smith Eiche, Apalachin, NY (US); Andrea Lynne Heithoff, Johnson City, NY (US); Walter A. Johnson, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/166,105

(22) Filed: Oct. 5, 1998

(51) Int. Cl.[7] .................................................. G06F 7/00

(52) U.S. Cl. .......................... 715/514; 715/500; 705/8; 705/10

(58) Field of Search ................................. 707/514, 513, 707/500; 705/8–10; 715/500, 513, 514

(56) References Cited

U.S. PATENT DOCUMENTS

| | | | | |
|---|---|---|---|---|
| 5,072,379 A | | 12/1991 | Eberhardt ....................... | 705/7 |
| 5,446,895 A | | 8/1995 | White et al. .................... | 717/1 |
| 5,524,077 A | * | 6/1996 | Faaland et al. ................. | 705/8 |
| 5,526,516 A | | 6/1996 | Tsuruta et al. .................. | 707/1 |
| 5,655,074 A | | 8/1997 | Rauscher ....................... | 714/38 |
| 5,680,557 A | * | 10/1997 | Karamchetty ............... | 345/765 |
| 5,729,746 A | * | 3/1998 | Leonard ....................... | 717/101 |
| 5,778,397 A | * | 7/1998 | Kupiec et al. ............... | 707/500 |
| 5,799,304 A | * | 8/1998 | Miller ........................... | 707/7 |
| 5,832,532 A | * | 11/1998 | Kennedy et al. ............. | 707/503 |
| 5,835,087 A | * | 11/1998 | Herz et al. .................... | 345/810 |

(List continued on next page.)

OTHER PUBLICATIONS

Software Compiler for Analyzing and Measuring Programs, IBM TBD, vol. 36, ISS.# 9A, p. 123–128, Sep. 1, 1993.*

Object–Oriented Proposal and Process Design Methodology Utilizing Case Tools, IBM TDB, vol. 37, ISS.#4A, p. 593–596, Apr. 1, 1994.*

T.P. Mukhopadhyay et al.; Software Effort Models for Early Estimation of Process Control Applications; IEEE Transations on Software Engineering, vol. 18, No. 10, Oct., 1992; pp. 915–924.

D.R. Jeffery et al.; Concise Papers: A Comparison of Function Point Counting Techniques; IEEE Transaction on Software Engineering, vol. 19, No. 5, May, 1993; pp. 529–532.

C.S. Murali et al.; Issues in Estimating Real–Time Data Communications Software Projects; Information and Software Technology, 39, 1997; pp. 399–402.

R. Rask et al.; Simulation and Comparison of Albrecht's Function Point and DeMarco's Function Bang Metrics in a Case Environment; IEEE Transactions on Software Eng., Vol 19, No 7, Jul. 1993; pp. 661–671.

R. J. Costello et al.; Metrics for Requirements Engineering; J. Systems Software, 1995; pp. 39–63.

*Primary Examiner*—Stephen S. Hong
*Assistant Examiner*—Cesar B Paula
(74) *Attorney, Agent, or Firm*—Whitham, Curtis & Christofferson, P.C.

(57) ABSTRACT

A system and method for estimating a metric of a proposed product from a document describing the product in an arbitrary degree of detail provides accuracy comparable to a function point assessment of a fully detailed document by parsing a document into a plurality of lines in an outline form and assigning a hierarchy to each line. Values or weights are determined for each of a relatively small plurality of key words in accordance with the key word and the hierarchy level of the line in the parsed document in which the key word is found. An adjustment is made based on a category of the key word such as nouns and verbs and the hierarchy level of the lines as compared with the number of hierarchy levels found in the document. Further adjustments may be made for subject matter domain of the product and the source or author of the document.

14 Claims, 5 Drawing Sheets

U.S. PATENT DOCUMENTS

| | | | |
|---|---|---|---|
| 5,864,480 A | * | 1/1999 | Ladd .......................... 700/83 |
| 5,880,959 A | * | 3/1999 | Shah et al. .................. 700/97 |
| 5,892,951 A | * | 4/1999 | Safonov ....................... 717/8 |
| 5,903,453 A | * | 5/1999 | Stoddard II ................. 700/79 |
| 5,911,134 A | * | 6/1999 | Castonguay et al. ... 379/112.01 |
| 5,918,207 A | * | 6/1999 | McGovern et al. ............ 705/1 |
| 5,960,407 A | * | 9/1999 | Vivona ......................... 705/1 |
| 6,008,817 A | * | 12/1999 | Gilmore, Jr. ................ 345/440 |
| 6,044,354 A | * | 3/2000 | Asplen, Jr. .................... 705/1 |
| 6,070,143 A | * | 5/2000 | Barney et al. ................. 705/8 |
| 6,115,691 A | * | 9/2000 | Ulwick ......................... 705/7 |
| 6,131,091 A | * | 10/2000 | Light ............................ 707/5 |
| 6,134,563 A | * | 10/2000 | Clancey et al. ............ 707/503 |
| 6,212,494 B1 | * | 4/2001 | Boguraev ...................... 704/9 |
| 6,289,255 B1 | * | 9/2001 | Shah et al. .................. 700/97 |
| 6,349,316 B2 | * | 2/2002 | Fein et al. .................. 715/531 |

* cited by examiner

| HIERARCHY LEVEL | |
|---|---|
| 1 2 3 4 5 6 7 8 ... N | |
| SEQUENCE No. | OBJECTS (OUTLINE) |
| 1 | I ...SHALL... |
| 1.1 | A. ...FILE... |
| 1.2.1 | 1. ...INTERFACE... |
| 1.2.2 | 2. ...LIBRARY... |
| 1.2.2.1 | a. ...INDEX... |
| 1.2.2.2 | b. ...TABLE... |
| . | . |
| . | . |
| . | . |
| 2 | II ...MUST... |
| 2.1 | A ...DATA... |
| 2.1.1 | 1 ...FILE... |
| 2.1.1.1 | a ...LIBRARY... |
| 2.1.1.2. | b ...INDEX... |
| 2.1.2 | 2 ...GRAPH... |
| 2.2 | B ...INTERFACE... |
| . | . |
| . | . |
| . | . |

FIG.2

| KEYWORDS | | |
|---|---|---|
| VERBS | NOUNS | FIGURES |
| SHALL<br>WILL<br>MUST | DATA<br>FILE<br>INDEX<br>LIBRARY<br>REPORT/LISTING<br>INTERFACE<br>TABLE<br>LEGACY | GRAPH<br>FIGURE |

| | SLOC | LINES | VERB WT | NOON WT | FIG WT | EST FP | ACT FP | VAR % |
|---|---|---|---|---|---|---|---|---|
| AVIONICS | | | | | | | | |
| MISSION A1 | 137091 | 1792 | 932 | 207 | 51 | 1190 | 1071 | 11 |
| MISSION A2 | 198470 | 1496 | 914 | 980 | 50 | 1944 | 1985 | 2 |
| MISSION H3 | 5517 | 276 | 252 | 176 | 13 | 441 | 335 | 32 |
| INFORMATION TECH | | | | | | | | |
| PROJECT S1 | 307200 | 3027 | 2170 | 1603 | 180 | 3953 | 4327 | 9 |
| PROJECT S2 | 297700 | 5719 | 812 | 2549 | 114 | 3475 | 4193 | 17 |
| PROJECT S3 | 150200 | 1486 | 358 | 2019 | 93 | 2470 | 2155 | 15 |
| PROJECT S4 | 345400 | 834 | 342 | 827 | 45 | 1214 | 4865 | 75 |
| PROJECT S5 | 380900 | 3172 | 2012 | 2766 | 141 | 4919 | 5365 | 8 |

SOFTWARE REQUIREMENTS METRICS AND EVALUATION PROCESS

BACKGROUND OF THE INVENTION

1. Field of the Invention

The present invention generally relates to estimation of factors associated with the economic costs of development of desired products by analysis of descriptions of features of the product, such as the functional content of software, and, more particularly, to a system and metric for quantitative evaluation of customer requirements for a desired product, especially a software application.

2. Description of the Prior Art

The use of computers for conducting various enterprises and activities has become substantially universal and the comparative advantage of computer use, itself, has been correspondingly diminished. Accordingly, at the present time, most significant advantages must accrue from closely matching software applications to the specific activity to be performed. Such matching of activities with facilities of a software application not only provides supports and enhancements for such activities (e.g. database management and access, archival records, decision support, etc.) but also ensures relatively optimal performance of the computer system, thereby reducing obsolescence of data processor hardware. For many computer installations, hardware costs for acceptable performance may be prohibitive without closely matching software functions to supported activity.

Matching of application capabilities and facilities generally begins with an analysis of the activities to be supported which may then be transformed into a listing of the functions the computer or data processor must perform, generally referred to as "requirements". The list of requirements will generally be refined through a series of iterations, each of increased detail until a final, fully detailed Software Requirements Specification (SRS) is achieved. A parallel process for an article of manufacture might comprise a sequence of an initial notation of an idea, a rough sketch, additional views of the object, sketches of parts and, eventually detailed drawings and specifications of each part or the article.

Commercial off-the-shelf software is often available to supply a set of functions meeting the needs of a relatively wide variety of potential customers while not all or even a majority of the functions may be needed by any given user. However, for many activities such as air traffic control and complex decision support systems for manufacture of certain types of goods, the potential customer base may be extremely limited while very complex functions and the management of access to potentially vast databases may be required within stringent processing time constraints. In these cases, the matching process may begin with a statement of a basic concept or a request for information (RFI) from a potential customer to a software company.

In the latter cases, the writing of new software code is generally required and the application extensively developed and refined over an extended period although some existing applications may be incorporated therein. The software developer will thus need to be able to estimate the cost of services over the course of development of software to meet a customer's needs although those needs may initially be only broadly and conceptually defined. The customer will often approach several software developers concurrently with a request for proposal (RFP) and the developer must be able to estimate costs with sufficient accuracy to be competitive with other software developers while seeking to avoid economic loss in regard to services provided to the customer and the final product and project price.

Accordingly, providing an accurate estimate of the cost of a project to the customer assumes a very great importance while the information from which the estimate is to be made often remains conceptual and lacking in detail. The potential for error in estimating cost can be seen to be especially great when it is considered that some specially developed applications, when completed, can comprise many hundreds of thousands of lines of code for which the underlying necessary technical concepts and even hardware may not exist when the project is initiated. Moreover, technical approaches to required functions may need to be not only developed but implemented in an efficient manner and numerous versions of lengthy sections of code may be written and rewritten many times before adequate performances is achieved. It is not unusual to employ several hundred skilled programmers full-time for an extended period, often exceeding several months, to complete a specially developed software application of a complexity which is becoming increasingly common.

An estimate of the quantitative functional content of a proposed software system is the foundation for the estimate of the development effort, cost, staffing, schedule and the like associated with the development of the software system. The quantitative functional content estimate, whether it is in function points, lines of code, object points or other functional proxy, is the primary input to the cost estimation process. This process may involve the use of commercially available parametric cost models such as the Constructive Cost Model (COCOMO, Barry Boehm, University of Southern California), Software Life Cycle Management (SLIM, Quantitative Software Management, McLean, Va.) or simply utilize the development organization's local metrics to estimate cost, schedule and staffing. In any costing process, a quantitative functional content estimate is necessary before the cost estimation process can proceed.

It is known that a computation or analysis methodology commonly referred to as function point assessment can yield quantitative functional content estimates of good accuracy for software development. Function point assessment is largely based on five types of entities: External Inputs (RI), external Outputs (EO), External Queries (EQ), External Interface Files (RIF) and Internal Logical Files (ILF). Each of these types of entities corresponds more or less closely with a quantitative amount of functionality and internal compatibility which is to be achieved in the context of other entities.

This methodology provides a numerical measure or functional proxy representing the amount of function to be developed for inclusion and integration within an application. (A function point can be considered as approximating a fixed number of lines of source code in a given programming language and is thus a good measure of programming costs once other cost sources such as the development of solutions to technical problems are resolved.) The function point assessment technique is well-established as the current benchmark against which any other estimation technique must be compared in terms of accuracy.

However, the function point assessment process assumes and requires mature and detailed documentation (e.g. a detailed software requirements specification (SRS)) and a clear technical solution determined for functionalities to be provided, neither of which is ordinarily available during initial stages of a project. In other words, the function point assessment can be accomplished only when the full functionality of the application is known and well-defined and documented and the technical solutions which will be used in developing the functions are known and established to be effective in the context of the remainder of the application.

Otherwise, the state of the art can be summarized as one of two basic approaches. The so-called Delphic process involves reading and study of a document, regardless of quality, maturity or level of detail by experienced personnel and assessment in a largely prospective manner, based on generally perceived similarities to past experience, to result in some credible forecast of possible functional content and resulting associated development cost. The other so-called linear approach involves evaluation of a somewhat higher level of documentation (but of less detail and maturity than an SRS), counting the number of required functions and a linear approximation of associated functional content applied to the counted number.

Neither of these methodologies provides any approach to a rigorous analysis of the totality of functional requirements of the desired software (or other product) as it may be understood or expressed at any given point in time prior to the production of an SRS or any quantitative analysis grounded in prior experience. Neither do these latter approaches provide the potential customer with a basis for confidence in the estimate made since the results are not documentable or necessarily repeatable.

In addition, there are further benefits to developing an accurate estimate of the scope of work involved to satisfy a particular set of customer requirements. For example, staffing requirements can be optimized from the inception of the project and the collective experience of programmers developed most fully and from the earliest possible date. It has also been found that potential productivity gains are more significant earlier in the cycle of creation of a desired product. However, if documentation comparable to an SRS which allows a function point analysis to be applied is not available, these potential benefits cannot be fully realized and generally cannot be realized in more than slight degree, if at all from documentation reflecting an early stage of development.

SUMMARY OF THE INVENTION

It is therefore an object of the present invention to provide a methodology of analyzing a requirements document of an arbitrary level of maturity and specificity for estimation of the functional content of a proposed software product.

It is another object of the invention to provide a methodology for the quantitative estimation of software functional content of documentable and repeatable accuracy.

It is a further object of the invention to provide an expert and potentially fully automated system and process for quantitative estimation of features, complexity or other metric of a proposed product such as the quantitative functional content of software from a document which may be less than fully descriptive thereof.

In order to accomplish these and other objects of the invention, a system and method are provided for estimating a metric of a product by processing a document which describes the product in an arbitrary degree of detail by parsing the document into requirements, detecting a key word in respective requirements, determining a value corresponding to the key word and the hierarchy level of the requirement in which it is detected, adjusting that value based on the hierarchy level of the line in which it is found relative to a number of hierarchy levels found in the document, and computing a total of a plurality of said adjusted values. Further adjustments are preferably made for subject matter domain of the document or product and the source or origin of the document.

BRIEF DESCRIPTION OF THE DRAWINGS

The foregoing and other objects, aspects and advantages will be better understood from the following detailed description of a preferred embodiment of the invention with reference to the drawings, in which:

FIGS. 2, 3 and 4 provide illustrations of data organizations and structures useful in the understanding of the invention.

DETAILED DESCRIPTION OF A PREFERRED EMBODIMENT OF THE INVENTION

Figure 1:
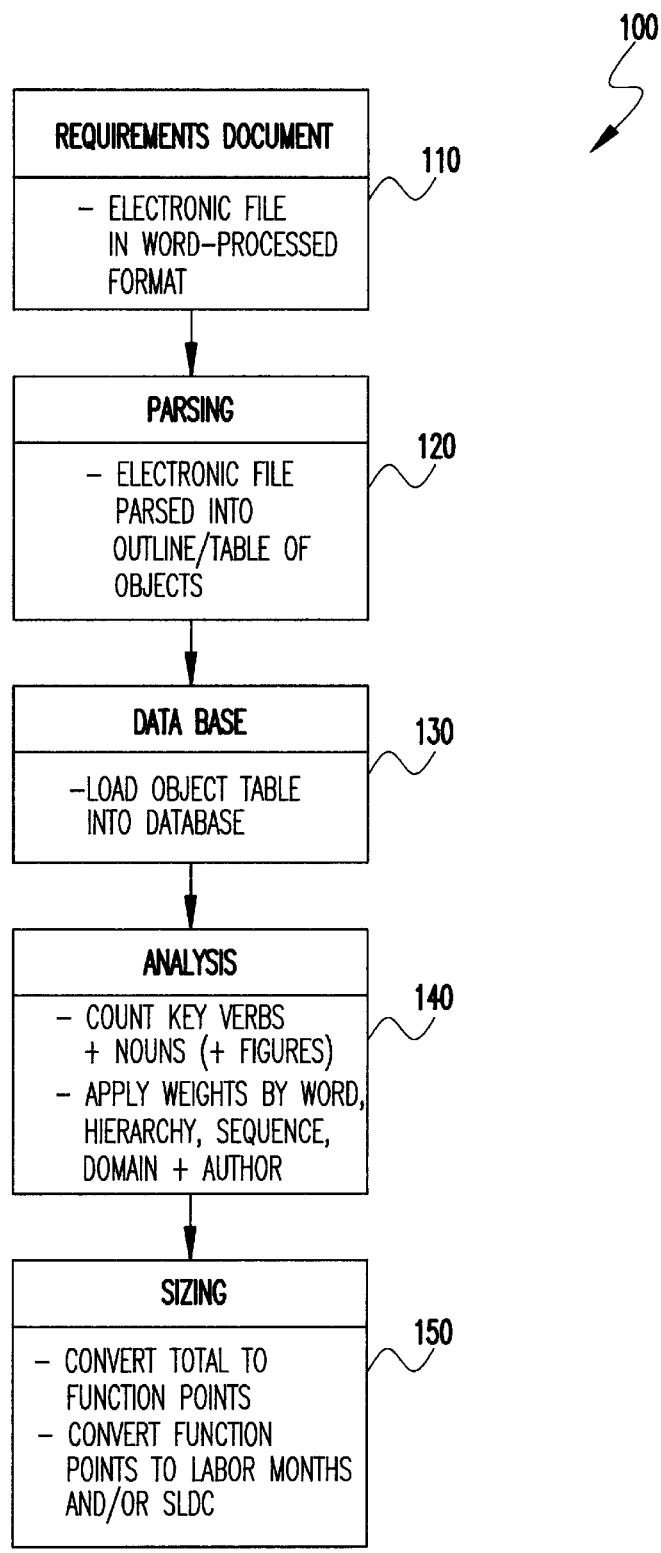
FIG. 1 is an overall flow diagram or high level block diagram of the invention.

Referring now to the drawings, and more particularly to FIG. 1, there is shown an overall flow chart or high level block diagram of the invention. It is to be understood that while some of the operations depicted are preferably performed through the use of known and commercially available software, no portion of any Figure is admitted to be prior art in regard to the present invention. It is also to be appreciated that FIGS. 1 and 5 can be understood as either process flow diagrams or schematic depictions of data processing apparatus of special purpose or programmed general purpose form, the latter being preferred at the present time for ease of implementation and modification of numerical values and processes as more refined weighting values, as will be discussed below, are empirically determined.

The overall function of the invention is to develop a quantitative estimate of a metric of a desired product such as the functional content of software from a document describing the product in an arbitrary degree of detail. That is, as applied to the development of software, the invention provides an automated (and thus consistently applied) technique for analyzing a document containing an arbitrary amount of detail to determine the quantity of function which must be developed in the completed application.

The process 100 begins with a document which is a narrative description, as it may exist at any arbitrary point in the course of a product development project, of the desired functions or product to be developed. That is, the document will be the most recently and fully developed description of the desired product currently available but may be highly conceptual and lacking in detail. The term "requirements document" will be used hereinafter to refer to such a document and, particularly, to connote that the degree of detail contained is arbitrary and presumably less than that of an SRS to which a known function point analysis could be applied. However, it is to be understood that the present invention is applicable to an SRS as well as less mature or complete documentation. The requirements document is also potentially arbitrary in form although, in practice, relatively well-established forms for requirements documents are generally employed and certain standards for requirements documents are often observed or required.

To provide automation of the estimation process, the requirements document must be provided as an electronic file in a word processed format, as indicated at 110. In practice, requirements documents are generally provided in both "hard copy" and "on disk". The particular word processor coding is not important to the practice of the invention and conversions between word processor codes are generally well-known and readily available. In an electronic file is not provided initially, a suitable electronic file can be developed by scanning the document with a commercially available scanner.

The requirements document is then parsed, as depicted at 120 into a form similar to an outline such that each statement forms a single line of parsed text. Several suitable software products are commercially available to perform this function; Dynamic Object Oriented Requirements System (DOORS), a product of Quality Systems and Software, Inc. of 100 Enterprise Drive, Rockway, N.J., is preferred at the present time. While the function of this software is relatively sophisticated in the analysis of sentence structure which is provided, the details thereof are unimportant to the practice of the present invention.

The parsing function can be visualized as separating the text of the requirements document into lines such that there will be, for example, only one requirement in the text of each line and that the sentence and paragraphs of the original requirements document are organized into an outline form preserving the context of the requirements document in the resulting lines of the outline. (No recognition of particular key words need be done in the course of the parsing function. However, the recognition of some terms during parsing may be useful in the analysis of some types of documents.) Thus, each line of the parsed document represents a single potential requirement. Further, as part of the parsing process, each line of the parsed outline will be assigned a sequence number corresponding to the structure and organization of the outline.

An example of the parsing function produced by DOORS is shown in FIG. 2. It should be understood, however, that production of a document similar to FIG. 2 is not necessary to the practice of the invention. It is entirely sufficient for the result of the parsing function to remain in electronic form. The outline 210 is preferably developed as a list of "objects" consistent with object-oriented programming with each object comprising a line of the outline. The basic nature of "objects" includes classes of entities or instances, each including attributes and relationships; the existence of which facilitates the organization of the objects into a sequence in a hierarchical form, As illustrated at 220, each line of the outline is provided with a sequence number such as 1.2.1, 1.2.2, 1.2.2.1 which corresponds to the indentations in outline 210. The number of digits (e.g. numbers separated by dots) in each sequence number corresponds to a hierarchy level 220. For example, the hierarchy level of line 211 of outline 210 is four and the hierarchy level of line 212 is three.

To summarize the parsing function 220, the text of the requirements document is separated into lines representing objects with the context of the requirements document represented in the sequence number which also determines a hierarchy level for each object/line of the outline. In this way, the parsing function develops a database containing an association of a hierarchy level value 230 with the text of each line of the parsed requirements document in an outline form. This database can then be searched with virtually any commercially available database application, as depicted at 130 of FIG. 1.

The inventors have discovered that certain terms and features of requirements documents together with their location in a requirements document are good indicators of the amount of functionality (or number of features of a product) that is described in a narrative text regardless of the degree of detail that may be present or lacking. Specifically, in accordance with the invention and for the preferred application to the development of software, the verbs "shall", "will" and "must" and the nouns "data", "file", "index", "library", "interface", "table", "legacy", "report", and "listing" are particularly indicative of software functionality and will be collectively referred to hereinafter as key words. Figures, graphs, and pictorial representations contained in a requirements document have also been found to indicate a quantitative amount of functionality.

It can be appreciated that the particular key words chosen do not necessarily convey any particular information about the features of the product such as the particular function that is to be performed or interfaced with another function. For example, in contrast with function point assessment, no distinction is made between external inputs, outputs and queries but assigns different weights or values to the few verbs "shall", "will" and "must". Among the nouns, only the substantial synonyms "report" and "listing" map closely to External Interface Files of classical function point analysis. (All commonly used synonyms should generally be included in the key words.) The remainder of the nouns generally correspond to interfaces which generally require a characteristic amount of development time, functionality and code. For products other than software, other terms would, of course, be employed but should be chosen to correspond to identifiable metrics in historical examples of design of other products or components thereof which are most similar to the proposed product.

Figures 3, 4:
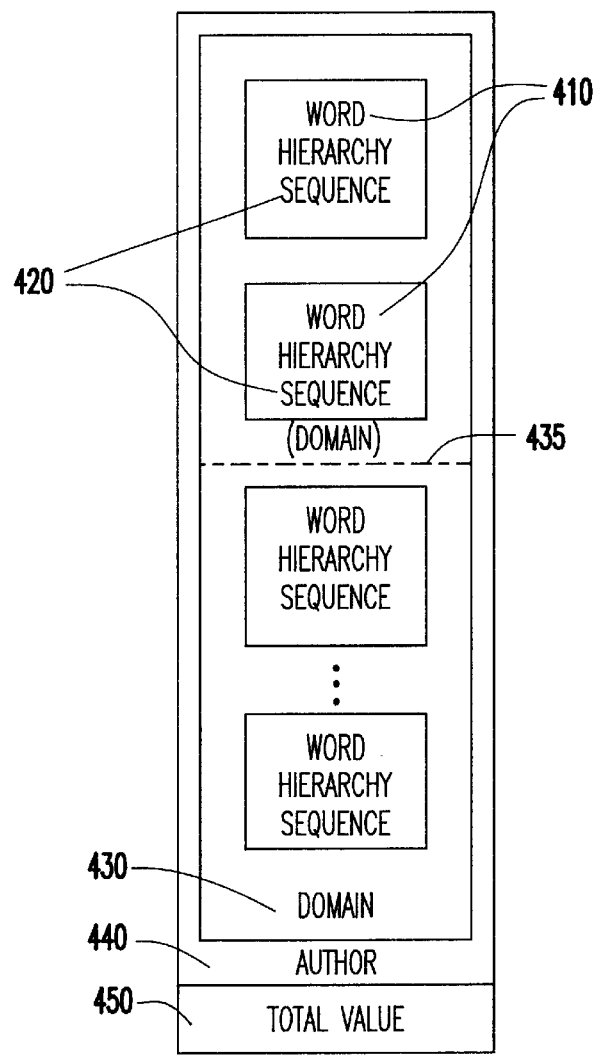

It is considered important in the practice of the invention to separately categorize nouns, verbs and figures, as shown in FIG. 3, although it is to be understood that different key words may be better indicators of development costs of products other than software and that additional or different key words could be used as well. However, the key words shown in FIG. 3 and listed above are considered entirely sufficient to provide performance in the analysis of any requirements document comparable to a function point analysis on a mature SRS.

It should be appreciated, however, that the amount of functionality connoted by each of these key words may differ from that corresponding to the other key words. The amount of functionality will also vary with the relative location within the requirements document and the amount of detail the requirements document can be expected to express as well as the type of function and the nature of the subject matter represented by the data to be processed by the application to be developed and the source of the requirements document itself. The analysis process 140 in accordance with an important aspect of the invention thus seeks to provide a quantitative assessment of each key word in the context of any particular document.

The overall function of the analysis process 140 in accordance with the invention is schematically illustrated in FIG. 4. Each key word will quantitatively represent an empirically determinable amount of functionality at each hierarchy level of the requirements document. The quantity of functionality will also vary differently between nouns and verbs based on relative sequence 420 among the hierarchical levels present in the document. The total amount of function will additionally vary with the subject matter of the data (referred to as domain 430) to be processed by the application and with the source/author 440 of the document.

That is, an empirically determined value corresponding to a particular key word and a particular hierarchy level is found and then adjusted by the location of the word in the sequence of the hierarchy present in the document. This adjustment of the value or weight accorded to the word and hierarchy level value allows documents of different complexity, maturity and level of detail to be similarly processed with comparable accuracy. The complexity corresponding to the domain is preferably commonly applied throughout the analysis of the requirements document but could be separately applied to different sections or hierarchy levels of the requirements document, as shown at 436. Each requirement document will usually be internally consistent in usage of terminology but usage will generally vary with the source, author or type of the requirements document. Accordingly, a further source/author adjustment is made collectively over all adjusted values.

The values, so adjusted and depicted as a column in FIG. 4, can then be accumulated or summed and the total functionality value converted to corresponding (e.g. equivalent in value) function points. The function point values can then be converted in a known manner and using commercially available software to a corresponding value of labor (e.g. employee months, source lines of code(SLOC), etc.), as shown at 150 of FIG. 1.

Figure 5:
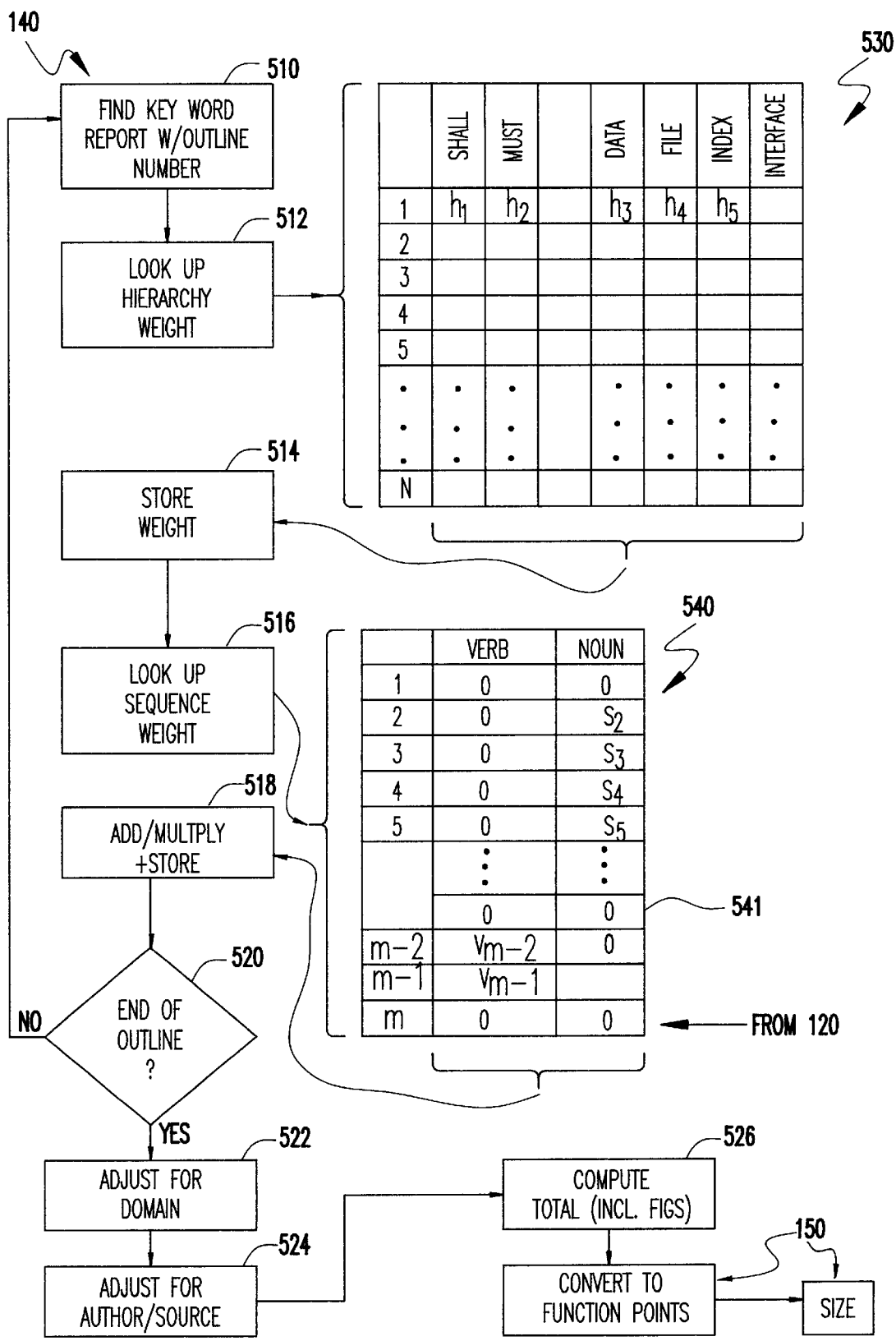
FIG. 5 is a more detailed flow diagram or high level block diagram of a portion of FIG. 1.

More specifically and with reference to FIG. 5, the analysis process is performed by searching the database of text and hierarchy values described above and associated with each line of parsed text for the key words of interest, as depicted at 510. When a key word is found, the hierarchy level of the line in which the key word was found is also returned and the word and hierarchy value are used to retrieve a hierarchy values (e.g., $h_1$, $h_2$, etc.) from table 530, as depicted at 512. Different tables 530 can be used for different domains, document types/lengths, subject matter other than software and the like if different behaviors are empirically observed. The value returned from table 530 is stored and a sequence adjustment value is similarly retrieved (516) from table 540.

It should be noted that while table 540 is logically organized in correspondence with hierarchy level, it preferably provides separate adjustments for groups of key words such as nouns and verbs which, as has been discovered by the inventors, very differently in regard to the amount of functionality connoted within the hierarchy present in a given requirements document. These adjustments can be implemented by addition of a further weight adjustment and/or multiplication by an adjustment factor to account for sequence behaviors, as depicted at 518.

This adjustment provides calibration for behaviors which correspond to the nature of documents relating to particular subject matter. A separate table is preferably provided or generated for the number, n, of hierarchy levels found and serves to accommodate requirements documents of greatly differing level of detail with comparable accuracy.

It should also be appreciated that while the weight associated with a key word and the sequence adjustment weight are both determined based upon the hierarchy level of the line on which the key word is found, the hierarchy level information is used very differently in processes 512 and 516. Specifically, the hierarchy weight determined from table 530 is based on the hierarchy level at which the key word is found regardless of the number, N, of hierarchy levels which may be provided in table 530 and for which appropriate weights have been empirically determined or estimated (e.g. by extrapolation). In contrast, the sequence weight for the adjustment, if any, made in operation 516, 518 is based upon the hierarchy level of the line in which the key word is found relative to the number, n, of hierarchy levels which are found in the parsed document. The use of the number of hierarchy levels found in the document in this latter operation is particularly important to achieving the function of maintaining comparable accuracy for documents of greatly differing degree of maturity and detail.

After a value has been established for the key word found at 510, it is determined whether any other key words remain in the parsed requirements document and the process loops from 520 to 510 if any further key words are to be found. It should be appreciated that the search order is not important to the practice of the preferred form of the invention. That is, it does not matter if the entire document is scanned for each word individually in some arbitrary order or whether each line is checked for each key word before proceeding to the next line of the parsed requirements document. It is similarly unimportant to the practice of the invention whether the looping occurs before or after the domain adjustment 522 or before or after the author/source adjustment 524.

Likewise, the order to the domain adjustment and the author source adjustment is unimportant to the practice of the invention. However, it is considered more convenient to perform the domain adjustment first since it has been found that the author/source adjustment is generally very small or very large and to more readily accommodate use of additional tables 530 for a portion of the domain adjustment. It may also be convenient to total the adjusted values immediately after branch 620 and prior to further adjustments or to simply accumulate values as they are retrieved unless different domain corrections are to be applied to respective portions of the requirements document, as alluded to above.

Once all adjustments to the weights, as described above, have been completed, the total of all the adjusted weights, including weights for figures, graphs and pictorial representations in the requirements document, is computed. The weight, itself, as adjusted, will directly approximate the number of function points. The conversion of the number of function points estimated by the invention to other parameters such as source lines of code (SLOC), programmer-months and the like can then be accomplished in the same manner as for the well-understood function point analysis to complete the sizing estimate 150. Commercially available software may then be used to convert the function point estimate to cost (e.g. labor months), schedule and staffing estimates and the like.

As alluded to above, the weights provided in tables 530 and 540 and the additional adjustments made for domain and author or source of the requirements are preferably determined empirically based on historical experience with design projects previously completed. Specifically, for any design project which has been completed or at least, in the case of software development, an SRS completed, a function point analysis can be carried out in a well-known and understood manner. The function points thus determined can be projected back onto earlier and less mature requirements documents for the same project by an overall adjustment for domain (which may initially be an arbitrary value and is, in any case, a relative correction between different domains) and then apportioning the adjusted number of function points corresponding to functions recited in the SRS between the hierarchy level weight and the sequence weight corresponding to a key word in each earlier document that has been parsed as described above in operation 120 of FIG. 1.

The apportionment between tables 530 and 540 can be accomplished by observing the difference in behavior of function points at a center hierarchy level relative to numerically high and low hierarchy levels for verbs and nouns or in other ways such as using behavior of weights in table 540 in several projects or over different requirements documents for the same project, computing an average or best fitting distribution for table 540 and placing the remainder of the required weight in table 530. Additional values for numerically higher hierarchy values in table 530 can be extrapolated. In any event, the apportionment of weight between tables 530 and 540 is not especially critical to the practice of the invention or the accuracy of the estimate produced. Statistical methods can be used to refine the apportionment over a plurality of design projects in the same domain and having the same source or author.

As alluded to above, it has been found by the inventors that the adjustment for source/author will generally be relatively large or small. Therefore, it can be neglected in an initial assignment of weight to tables 530 and 540. When an analysis in accordance with the invention diverges significantly from the result obtained using function point analysis on the eventually developed SRS and the author and/or source differs from the historical data employed to produce the weights, the discrepancy can be attributed to the author/source with high confidence and an adjustment that causes agreement between the results of the invention and a function point analysis can thereafter be used to approximate the author/source adjustment value. The author/source adjustment value can also be refined over time and increased amounts of historical data by statistical techniques (e.g. averaging, curve-fitting or the like).

In view of the foregoing, it is seen that the invention provides a potentially fully automated, consistent and documentable methodology for estimation of the functional content of software or the effort required for any other design project. In practice, the correlation of the results of the invention with function point analysis is extremely high.

Figures 6, 7:
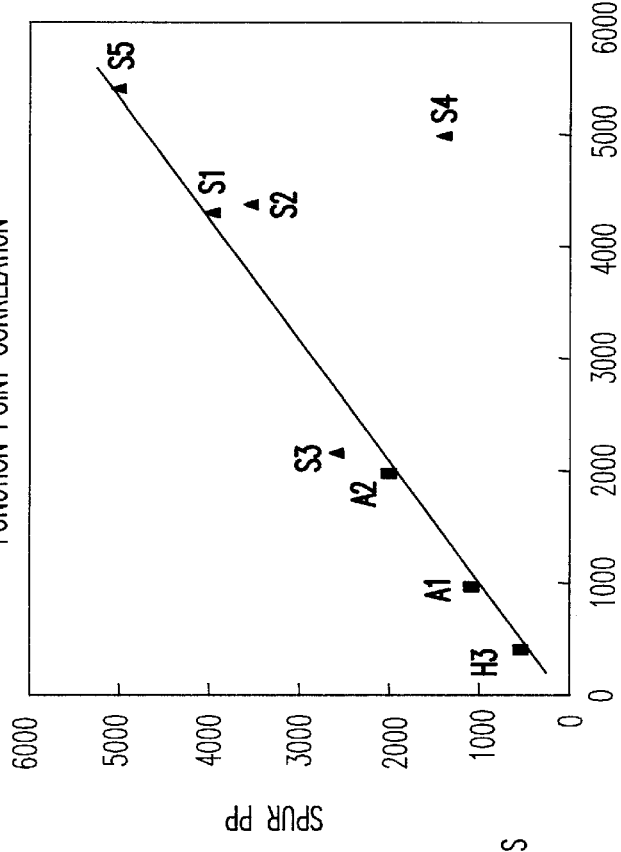
FIG. 6 is a table of parameters of different software applications to which the invention has been applied.
FIG. 7 is a graph comparing the performance of the invention with the performances of function point analysis.

For example, FIG. 6 shows the results of use of the invention on documents of varying degrees of detail and maturity for software development projects of varying size. The column showing "lines" is the number of lines of possible required function determined in the parsing process 120 of FIG. 1. Although it is to be understood that the number of lines so developed is not directly used in the processing in accordance with the invention, the number of lines relative to the number of function points is a rough indicator of the maturity and completeness of the requirements document analyzed. For example, "Mission A2" has a function point count of nearly twice that of "Mission A1" (both in the same domain) and the significantly smaller number of lines for "Mission A2" thus indicates a much less mature and detailed requirements document. Thus FIG. 6 represents a wide variety of stages of documentation. The verb weight, noun weight, figure weight and total estimated function points for each project are shown. The actual function point count and the percentage variance of the estimate therefrom are also shown and the variance is seen to be generally smaller and below 20%. Half of the percentage variances are 11% or below.

Of the two largest percentage variances "mission H3" requires, by far, the smallest number of line of code and number of function points and, as shown in FIG. 7, remains high linearity of correlation with the actual function count. It has been found that the largest percentage variance for Project 34 resulted from improper author/source adjustment, thus demonstrating that large departures from a linear correlation of the results of the invention with traditional function point analysis may be attributed to and corrected by the author/source adjustment.

Accordingly, it can be seen that the invention provides an automated consistent and documentable method and system for accurately estimating a metric of a proposed or desired product from which estimates or planning of staffing, scheduling, costing and the like can be accurately projected particularly for extensive software to meet complex requirements. The accuracy of results derived from the invention are closely and linearly correlated with the benchmark function point assessment methodology but can be performed from documentation of arbitrary degree of maturity and detail and potentially of far less detail than an SRS, required for function point assessment to be accomplished.

The methodology and system of the invention are not limited in applicability to the quantitative estimation of software functionality, to which it is considered particularly applicable because of the extent and complexity of many current software design projects, but could be applied to the design of any desired proposed product such as mechanical and electrical devices in which numerous requirements must by simultaneously met. Particularly in this regard, it should be recognized that the weight values contained in tables 530 and 540 as well as the domain and source/author adjustment values, while readily derived and refined, embody a substantial amount of historical experience with generally similar subject matter and the system in accordance with the invention is thus well-described as an expert system.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for estimating a metric of a product from a description of the product, said description of the product being in an arbitrary degree of detail, said method comprising the steps of
    separating said description of said product into a plurality of separate single requirements for the product to provide as described in said description of said product,
    assigning a hierarchy level to respective ones of said separate requirements,
    detecting key words in respective ones of said requirements,
    determining a value corresponding to a said key word and a said hierarchy level of the separate single requirement in which said key word is detected,
    adjusting said value based on said hierarchy level relative to a number of hierarchy levels found in said description to derive an adjusted value for said key word detected by said detecting step, and
    computing a total of a plurality of said adjusted values.

2. A method as recited in claim 1, comprising the further step of
    adjusting said total of a plurality of said adjusted value in accordance with a subject matter domain of said document.

3. A method as recited in claim 2, comprising the further step of
    adjusting said total of a plurality of said adjusted value in accordance with a source of said document.

4. A method as recited in claim 1, comprising the further step of adjusting said total of a plurality of said adjusted value in accordance with a source of said document.

5. A method as recited in claim 1, including the further step of parsing said document into an outline form.

6. A method as recited in claim 1 wherein one of said determining step and said adjusting step includes the further step of accessing a value from storage in accordance with said hierarchy value.

7. A system for estimating a metric of a product by processing a document descriptive of the product, said document describing the product in an arbitrary degree of detail, said system including means for parsing said document into requirements the product is to provide, as described in said document, in hierarchy levels, means for detecting a key word in respective ones of said requirements, means for determining a value corresponding to said key word and a said hierarchy level of the separate single requirement in which said key word is detected, means for adjusting said value based on said hierarchy level relative to a number of hierarchy levels found in said document to derive an adjusted value for said key word detected by said detecting step, and means for computing a total of a plurality of said adjusted values.

8. A system as recited in claim 7, further including means for adjusting said total in accordance with a subject matter domain of said document.

9. A system as recited in claim 8, further including means for adjusting said total in accordance with a source of said document.

10. A system as recited in claim 7, further including means for adjusting said total in accordance with a source of said document.

11. A system as recited in claim 7, wherein said means for determining includes a table of said values.

12. A system as recited in claim 7, wherein said means for adjusting includes a table of values.

13. A method as recited in claim 1, wherein said arbitrary degree of detail represents desired functions or requirements of a product as it may exist at any arbitrary point in the course of development of the product including ones of a series of design iterations in differing degree of detail.

14. A system as recited in claim 7, wherein said arbitrary degree of detail represents desired functions or requirements of a product as it may exist at any arbitrary point in the course of development of the product including ones of a series of design iterations in differing degrees of detail.

\* \* \* \* \*